No. 863,903. PATENTED AUG. 20, 1907.
A. J. M. CHAPPLE.
PIPE COUPLING.
APPLICATION FILED OCT. 31, 1906.
2 SHEETS—SHEET 1.
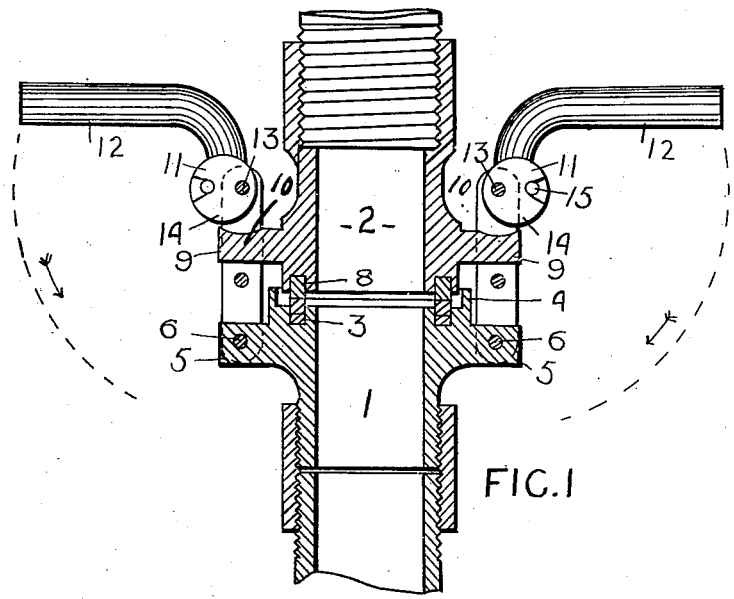
FIG.1
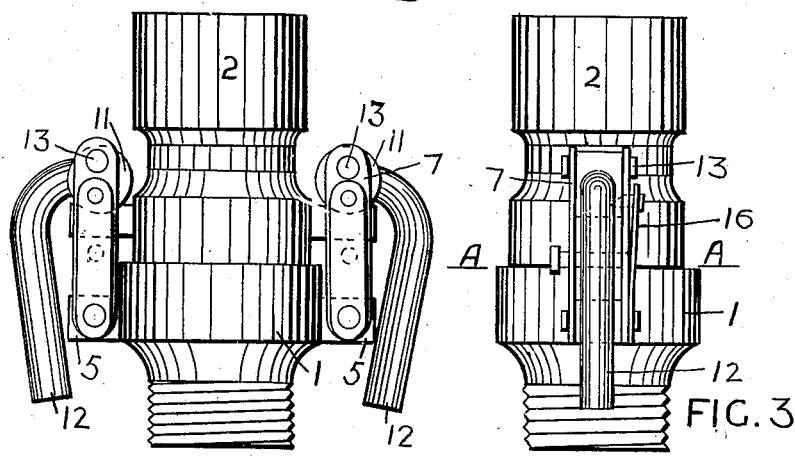
FIG.2
FIG.3
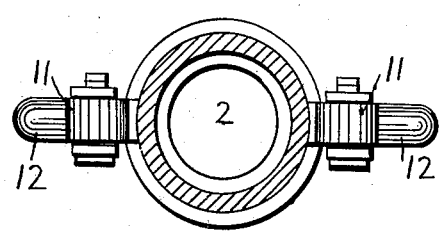
FIG.4
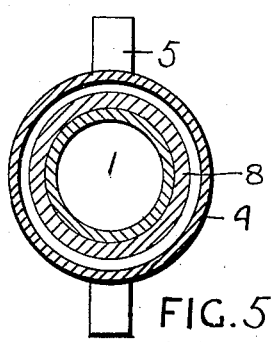
FIG.5
WITNESSES
W. P. Burk
H. W. Siericks
INVENTOR
Albert John Morphett Chapple
By Richard R.
ATT'YS No. 863,903. PATENTED AUG. 20, 1907.
A. J. M. CHAPPLE.
PIPE COUPLING.
APPLICATION FILED OCT. 31, 1906.
2 SHEETS—SHEET 2.
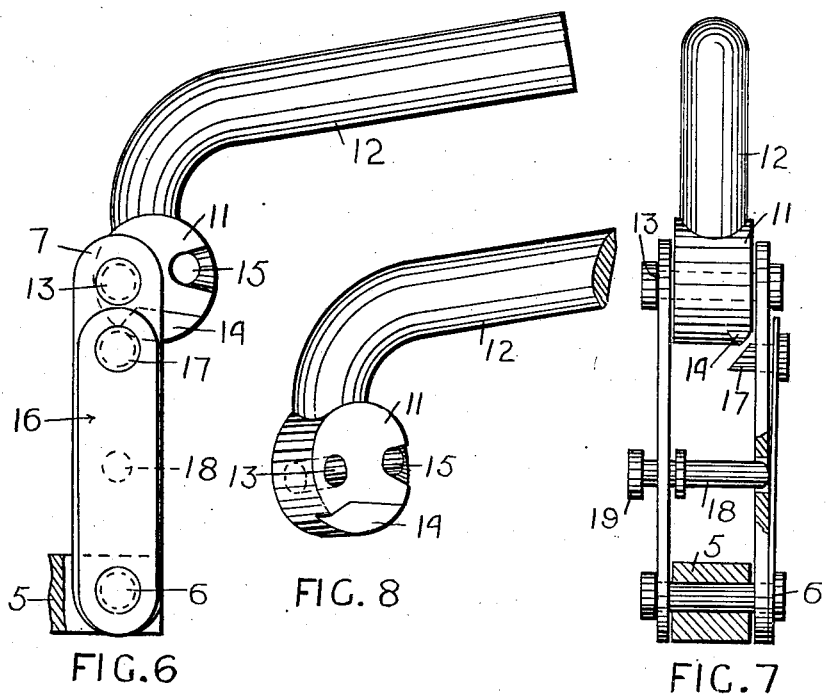
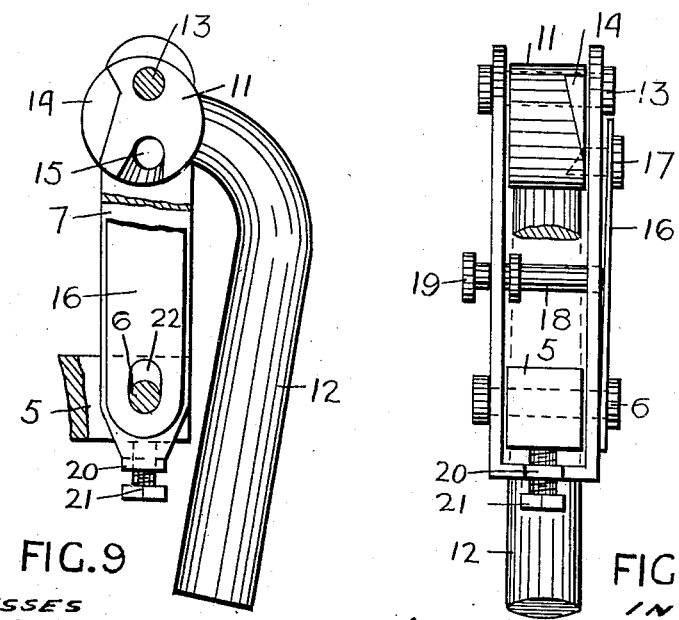
WITNESSES
W. P. Burke
H. H. Diericho
INVENTOR
Albert John Morphett Chapple
By Richards
ATTYS

UNITED STATES PATENT OFFICE.

ALBERT J. M. CHAPPLE, OF COBAR, NEW SOUTH WALES, AUSTRALIA.

PIPE-COUPLING.

No. 863,903.

Specification of Letters Patent.

Patented Aug. 20, 1907.

Application filed October 31, 1906. Serial No. 341,432.

*To all whom it may concern:*

Be it known that I, ALBERT JOHN MORPHETT CHAPPLE, a subject of the King of Great Britain and Ireland, and residing at Cobar, in the State of New South Wales, Commonwealth of Australia, have invented new and useful Improvements in an Improved Pipe-Coupling, of which the following is a specification.

This invention relates to pipe couplings for metal or other pipes or for use in connection with rubber, leather, or canvas hose in which pressure or vacuum is to be maintained and has for its object the speedy coupling and uncoupling of such pipes or hose.

It is especially suitable for a temporary service or for a service wherein coupling and uncoupling is frequently resorted to.

Referring to the drawings: Figure 1 is a transverse section through the coupling attached to two pipe ends and showing the apparatus in position for coupling. Fig. 2 elevation showing the apparatus in the coupled position. Fig. 3 side elevation. Fig. 4 plan. Fig. 5 plan on line A A Fig. 3. Fig. 6 enlarged side elevation of locking mechanism shown in position to couple. Fig. 7 end elevation of same. Fig. 8 perspective view of locking eccentric. Fig. 9 enlarged side elevation and part section of locking mechanism shown in coupled position; and Fig. 10 end elevation of same. In the latter figures a modification of the invention is shown.

The heads 1 and 2 are threaded at their outer end and the pipes to be coupled are screwed thereto. The head 1 is recessed to take a jointing washer 3 and a lip 4 is formed around the washer to provide a guide for the head 2. Wings 5 are cast upon the head 1 upon which are pivotally mounted at 6 connecting links 7. The head 2 is also recessed to take a jointing washer 8 and is provided with wings 9 formed with a channel or recess 10. The links 7 are adapted to move freely upon their pivots 6 and upon their free upper end an eccentric 11 provided with a lever handle 12 is pivoted at 13. Upon one side of the eccentric 11 a graduated depression 14 is formed and preferably upon that same face a recess 15 is provided.

A leaf spring 16 is mounted at 6 upon each pair of links 7 and is provided with a locking pin 17 adapted to engage with the recess 15 in the eccentric 11. A spindle 18 provided with a thumb piece 19 is threaded through both cheeks of the links 7 and is adapted to withdraw the locking pin 17 from the recess 15 by forcing the spring 16 outwards.

In operation the heads 1 and 2 are secured to their respective pipes and are brought into position for coupling by bringing the joints 3 and 8 together; the links 7 are hinged upwards to embrace the wings 9 on the head 2 and the levers 12 are raised, thus bringing the eccentrics 11 into place above the channel or way 10. The lever handles 12 are then pressed downwards in the direction indicated by the arrows, thus rotating the eccentrics 11 in the grooves or channels 10 on the lugs 9 and causing the two heads 1 and 2 to be forced together at their joints 3 and 8. The levers 12 are depressed until the eccentrics have passed over the "center." The rotation of the eccentrics 11 causes the graduated depression 14 formed in the face of the eccentric to come into contact with the locking pin 17 mounted upon the spring 16 and forces it back until it rides upon the face of the eccentric 11 from whence it falls into the recess 15, thus locking the eccentrics in position.

To uncouple the heads 1 and 2 from one another, the thumb piece 19 on the spindle 18 is pressed inwards thus retiring the spring 16 and at the same time withdrawing the locking pin 17 from its recess 15. The levers 12 are then free to be hinged upwards thus retiring the eccentrics and relieving their pressure on the wings 9. The links are then swung down to permit of the heads 1 and 2 being disconnected.

A modification of the invention is shown in Figs. 9 and 10 in which the compression effect of the eccentrics may be supplemented by the action of adjusting screws so as to compensate for the wear of the jointing material and of the working parts of the mechanism. In this case the links are formed in one piece as shown in the above Figs. 9 and 10 and are tapped at 20 to take a set screw 21 which bears against the wing 5. A slotted hole 22 is formed in the link 7 to permit of vertical movement.

Although the invention has been described with reference to the coupling of metal or other pipes, still it is to be understood as being equally applicable to the coupling of rubber, canvas, leather, or such like pipes or hose. In such case, however, the screwed ends of the heads 1 and 2 are dispensed with and corrugated or ribbed ends suitable for fastening such pipes are substituted.

What I claim as my invention, and desire to secure by Letters Patent, is:—

1. In a pipe coupling the combination of two heads provided with wings, coupling links journaled to the wings of one of the heads, each provided with an eccentric disk journaled at the free end adapted during rotation to force the heads together upon their joints, locking mechanism comprising a spring stop pin thereon and means for operating the spring, substantially as described.

2. In a pipe coupling the combination of two heads provided with wings of jointing material inserted in the faces of the heads, eccentrically journaled disks provided with operative levers, coupling links journaled upon one of the heads, locking mechanism comprising a leaf spring carrying a locking pin operated by a graduated depression upon the face of the disk during its rotation and means for retiring the spring to withdraw the locking pin to uncouple, substantially as described.

3. In a pipe coupling the combination of two heads, adapted to be secured at the outer end to pipes or hose, provided with wings, coupling links, compressing eccentrics, locking and unlocking mechanism comprising a leaf spring pivoted to each link, locking pin secured thereto, and an unlocking pin, threaded through the cheeks of the links and adapted to retire the end of the spring to disengage the pin from the eccentric disk, substantially as described.

4. In a pipe coupling, the combination of two heads adapted to be secured at the outer end to pipes or hose, provided with wings, coupling links connected to the rings of one of the heads, wear compensating mechanism for said links, compressing eccentrics carried by the links, locking and unlocking mechanism comprising a leaf spring pivoted to each link, a locking pin secured thereto, and an unlocking pin passing through the cheeks of the links and adapted to retire the end of the spring to disengage the pin from the eccentric disk, substantially as described.

In testimony whereof I have signed my name to this specification in the presence of two subscribing witnesses.

ALBERT J. M. CHAPPLE.

Witnesses:
ORLANDO H. BAKER,
W. I. DAVIS.